United States Patent
Park et al.

(10) Patent No.: US 10,630,349 B2
(45) Date of Patent: Apr. 21, 2020

(54) MULTI-LAYER MODULATED STREAMS

(71) Applicant: QUALCOMM Incorporated, San Diego, CA (US)

(72) Inventors: Seyong Park, San Diego, CA (US); Joseph Binamira Soriaga, San Diego, CA (US); Jay Kumar Sundararajan, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/164,731

(22) Filed: Oct. 18, 2018

(65) Prior Publication Data

US 2019/0123788 A1    Apr. 25, 2019

Related U.S. Application Data

(60) Provisional application No. 62/575,276, filed on Oct. 20, 2017.

(51) Int. Cl.
*H04B 7/0413* (2017.01)
*H04L 5/00* (2006.01)
(Continued)

(52) U.S. Cl.
CPC ......... *H04B 7/0413* (2013.01); *H04B 7/0426* (2013.01); *H04L 5/0051* (2013.01);
(Continued)

(58) Field of Classification Search
CPC ... H04B 7/0413; H04B 7/0426; H04L 5/0051; H04W 52/262; H04W 72/042
See application file for complete search history.

(56) References Cited

U.S. PATENT DOCUMENTS

2007/0270170 A1   11/2007  Yoon et al.
2007/0297533 A1*  12/2007  Chitrapu ............... H04L 27/183
                                                              375/308
(Continued)

OTHER PUBLICATIONS

International Search Report and Written Opinion—PCT/US2018/056748—ISA/EPO—dated Feb. 12, 2019 (180401WO).

*Primary Examiner* — David S Huang
(74) *Attorney, Agent, or Firm* — Holland & Hart LLP/Qualcomm

(57) ABSTRACT

Methods, systems, and devices for wireless communications are described. A wireless device may divide a data stream into multiple data sub-streams. The wireless device may map the data sub-streams to a set of layers of a multi-layer modulated stream. The wireless device may encode, rate match, modulate, spread and scramble the set of layers before combining them into a combined data stream. The number of layers in the set of layers may be configurable. The wireless device may apply scrambling sequences to the layers. An additional phase rotation or power scaling factor may be applied to each layer. The layers may then be synchronized and combined into a combined data stream. A set of combined data streams may be mapped to multiple-input, multiple-output (MIMO) layers. The wireless device may precode the MIMO layers, map the MIMO layers to tones, and transmit the combined data streams.

28 Claims, 12 Drawing Sheets

(51) Int. Cl.
*H04W 72/04* (2009.01)
*H04L 27/34* (2006.01)
*H04B 7/0426* (2017.01)
*H04W 52/26* (2009.01)

(52) U.S. Cl.
CPC ....... *H04L 27/3488* (2013.01); *H04W 52/262* (2013.01); *H04W 72/042* (2013.01); *H04L 5/0025* (2013.01); *H04L 5/0044* (2013.01)

(56) References Cited

U.S. PATENT DOCUMENTS

| | | | |
|---|---|---|---|
| 2012/0121031 A1* | 5/2012 | Tang | H04B 7/046 375/267 |
| 2013/0173999 A1* | 7/2013 | Park | H04L 27/3488 714/807 |
| 2015/0139120 A1 | 5/2015 | Elarabawy et al. | |
| 2016/0165457 A1* | 6/2016 | Inoue | H04W 16/28 455/562.1 |

* cited by examiner

MULTI-LAYER MODULATED STREAMS

CROSS REFERENCES

The present Application for Patent claims the benefit of U.S. Provisional Patent Application No. 62/575,276 by PARK, et al., entitled "MULTI-LAYER MODULATED STREAMS," filed Oct. 20, 2017, assigned to the assignee hereof, and expressly incorporated by reference in its entirety.

BACKGROUND

The following relates generally to wireless communication, and more specifically to multi-layer modulated streams.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long-Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some wireless communications systems, wireless devices may communicate using multiple-input, multiple-output (MIMO) techniques, where data streams may be mapped to one or more MIMO layers for transmission. Conventional techniques for communicating using MIMO may be deficient.

SUMMARY

A wireless device may divide a data stream into multiple data sub-streams. The wireless device may map the data sub-streams to a set of layers of a multi-layer modulated stream. The wireless device may encode, rate match, modulate, spread and scramble the set of layers before combining them into a combined data stream. The number of layers in the set of layers may be configurable. The layer mapping may provide a one-to-one mapping or a one-to-many mapping of data sub-streams to a set of layers (e.g., resource sharing multiple-access (RSMA) layers), among other mapping configurations. Mapping the data sub-stream to multiple layers may provide greater redundancy for the information bits of the data sub-stream. The wireless device may apply pseudorandom scrambling sequences to each of the layers. The pseudorandom scrambling sequences may be layer-specific short codes. In some cases, the pseudorandom scrambling sequences may be orthogonal to each other, such that the layers are orthogonal to each other after the scrambling sequences are applied. In some cases, an additional phase rotation or power scaling factor may be applied to each layer. The layers may then be synchronized and combined (e.g., added) into a combined data stream. The wireless device may apply a scrambling sequence to the combined data stream.

A set of combined data streams may be mapped to multiple-input, multiple-output (MIMO) layers. The MIMO layer mapping may have various mapping configurations. In some examples, the wireless device may transmit a combination of multi-layer modulated streams and non-multi-layer modulated streams (e.g., single-layer modulated streams). The wireless device may precode the MIMO layers and map the precoded MIMO layers to different tones for transmission. The wireless device may apply a cyclic prefix to the MIMO layers. In some cases, the cyclic prefix may be an orthogonal frequency division multiplexing (OFDM) cyclic prefix. The wireless device may then transmit the modulated streams using MIMO antennas to another wireless device.

A method of wireless communication is described. The method may include identifying a data stream for transmission to a wireless device in a multi-layer modulated stream, splitting the data stream into a plurality of data sub-streams, mapping the plurality of data sub-streams to a plurality of layers of the multi-layer modulated stream according to a multi-layer modulated stream mapping configuration, combining the plurality of layers into a combined data stream, and transmitting the combined data stream to the wireless device in the multi-layer modulated stream.

An apparatus for wireless communication is described. The apparatus may include means for identifying a data stream for transmission to a wireless device in a multi-layer modulated stream, means for splitting the data stream into a plurality of data sub-streams, means for mapping the plurality of data sub-streams to a plurality of layers of the multi-layer modulated stream according to a multi-layer modulated stream mapping configuration, means for combining the plurality of layers into a combined data stream, and means for transmitting the combined data stream to the wireless device in the multi-layer modulated stream.

Another apparatus for wireless communication is described. The apparatus may include a processor, memory in electronic communication with the processor, and instructions stored in the memory. The instructions may be operable to cause the processor to identify a data stream for transmission to a wireless device in a multi-layer modulated stream, split the data stream into a plurality of data sub-streams, map the plurality of data sub-streams to a plurality of layers of the multi-layer modulated stream according to a multi-layer modulated stream mapping configuration, combine the plurality of layers into a combined data stream, and transmit the combined data stream to the wireless device in the multi-layer modulated stream.

A non-transitory computer-readable medium for wireless communication is described. The non-transitory computer-readable medium may include instructions operable to cause a processor to identify a data stream for transmission to a wireless device in a multi-layer modulated stream, split the data stream into a plurality of data sub-streams, map the plurality of data sub-streams to a plurality of layers of the multi-layer modulated stream according to a multi-layer modulated stream mapping configuration, combine the plurality of layers into a combined data stream, and transmit the combined data stream to the wireless device in the multi-layer modulated stream.

Some examples of the method, apparatus, and non-transitory computer-readable medium described above may further include processes, features, means, or instructions for receiving downlink control signaling indicating the multi-layer modulated stream mapping configuration. In some examples of the method, apparatus, and non-transitory computer-readable medium described above, the multi-layer modulated stream mapping configuration comprises a one data sub-stream to one layer mapping, a one data sub-stream to many layer mapping, a many data sub-stream to one layer mapping, or a combination thereof.

Some examples of the method, apparatus, and non-transitory computer-readable medium described above may further include processes, features, means, or instructions for mapping a plurality of combined data streams from a plurality of multi-layer modulated streams to a plurality of MIMO layers according to a MIMO mapping configuration. In some examples of the method, apparatus, and non-transitory computer-readable medium described above, the MIMO mapping configuration comprises a one multi-layer modulated stream to one MIMO layer mapping, a one multi-layer modulated stream to many MIMO layer mapping, a many multi-layer modulated stream to one MIMO layer mapping, or a combination thereof.

Some examples of the method, apparatus, and non-transitory computer-readable medium described above may further include processes, features, means, or instructions for mapping a plurality of data streams from a plurality of single-layer modulated streams to the plurality of MIMO layers. Some examples of the method, apparatus, and non-transitory computer-readable medium described above may further include processes, features, means, or instructions for generating a demodulation reference signal (DMRS) corresponding to each of the MIMO layers. Some examples of the method, apparatus, and non-transitory computer-readable medium described above may further include processes, features, means, or instructions for precoding each of the plurality of MIMO layers with the each corresponding DMRS.

Some examples of the method, apparatus, and non-transitory computer-readable medium described above may further include processes, features, means, or instructions for precoding each of the plurality of MIMO layers. Some examples of the method, apparatus, and non-transitory computer-readable medium described above may further include processes, features, means, or instructions for generating a DMRS corresponding to each of the precoded MIMO layers. In some examples of the method, apparatus, and non-transitory computer-readable medium described above, splitting the data stream into the plurality of data sub-streams includes segmenting a transport block into a plurality of segmented transport blocks or assigning a plurality of transport blocks to different sub-data streams, or both.

Some examples of the method, apparatus, and non-transitory computer-readable medium described above may further include processes, features, means, or instructions for encoding each of the plurality of layers after mapping the plurality of data sub-streams to the plurality of layers. Some examples of the method, apparatus, and non-transitory computer-readable medium described above may further include processes, features, means, or instructions for modulating each of the plurality of encoded layers onto respective sets of symbols. Some examples of the method, apparatus, and non-transitory computer-readable medium described above may further include processes, features, means, or instructions for spreading each of the plurality of layers according to repetition spreading.

In some examples of the method, apparatus, and non-transitory computer-readable medium described above, the plurality of layers may be each spread using a same number of repetitions. In some examples of the method, apparatus, and non-transitory computer-readable medium described above, the plurality of layers may be each spread using a different number of repetitions. Some examples of the method, apparatus, and non-transitory computer-readable medium described above may further include processes, features, means, or instructions for applying a pseudo-random scrambling sequence to each of the plurality of layers. Some examples of the method, apparatus, and non-transitory computer-readable medium described above may further include processes, features, means, or instructions for applying a phase rotation, a power scaling factor, or a combination thereof, to each of the plurality of layers.

Some examples of the method, apparatus, and non-transitory computer-readable medium described above may further include processes, features, means, or instructions for synchronizing the plurality of layers with respect to each other before combining the plurality of layers. Some examples of the method, apparatus, and non-transitory computer-readable medium described above may further include processes, features, means, or instructions for applying a scrambling code to the combined data stream prior to transmission, wherein the scrambling code may be specific to the wireless device. Some examples of the method, apparatus, and non-transitory computer-readable medium described above may further include processes, features, means, or instructions for encoding each of the plurality of data sub-streams according to a code rate before mapping the plurality of data sub-streams to the plurality of layers. In some examples of the method, apparatus, and non-transitory computer-readable medium described above, the code rate may be based at least in part on a number of the multiple data sub-streams.

Some examples of the method, apparatus, and non-transitory computer-readable medium described above may further include processes, features, means, or instructions for adjusting a rate of transmission associated with the multi-layer modulated stream by adjusting a number of the plurality of data sub-streams, adjusting a number of the plurality of layers, adjusting the multi-layer modulated stream mapping configuration, adjusting a repetition factor for the plurality of layers, adjusting a pseudo random sequence for the plurality of layers, adjusting power or phase shift factor for the plurality of layers, or adjusting a combination thereof.

DETAILED DESCRIPTION

Figure 1:
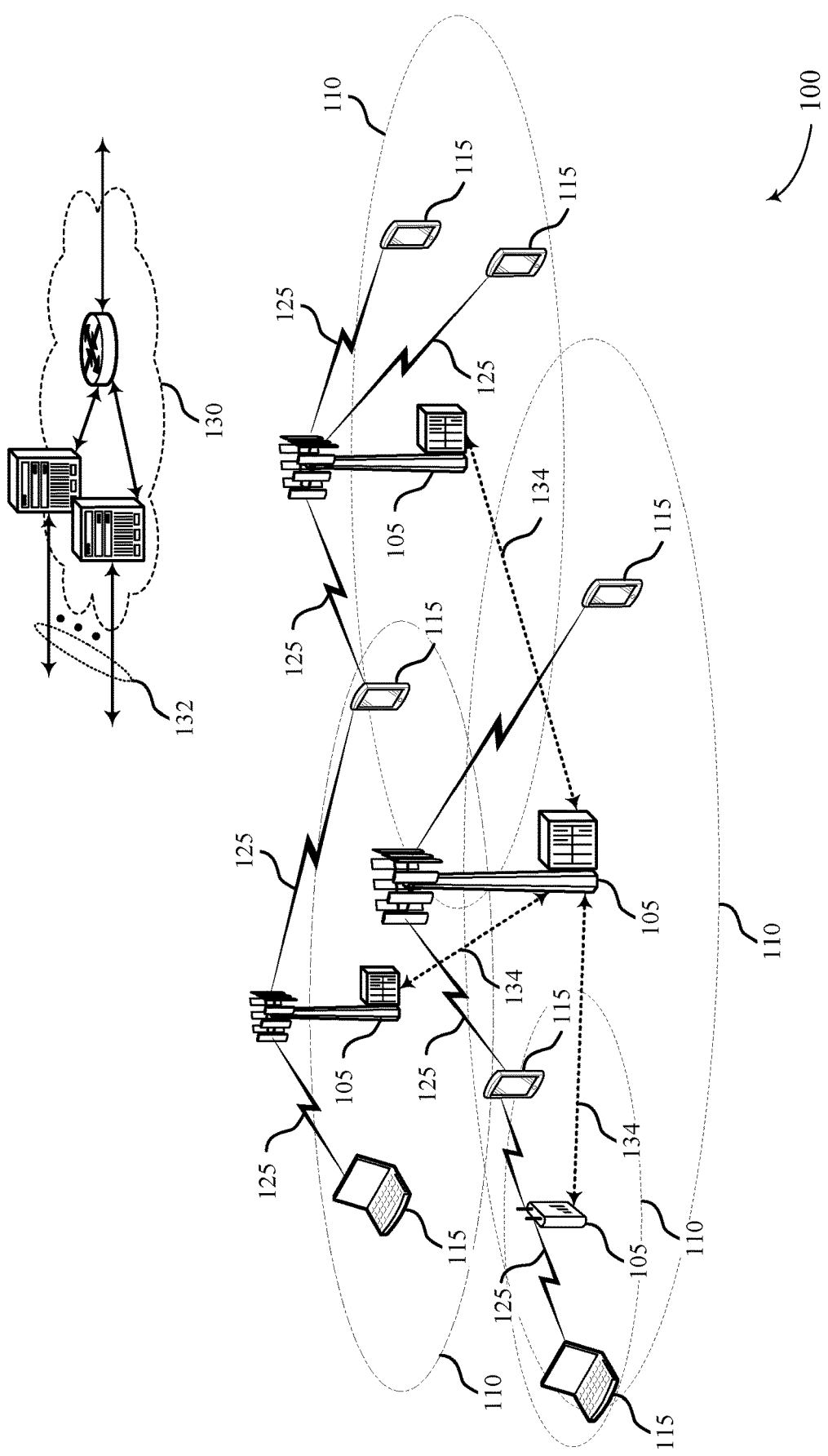
FIGS. 1 and 2 illustrate examples of wireless communications systems that support multi-layer modulated streams in accordance with aspects of the present disclosure.

A wireless device may prepare multi-layer resource sharing multiple-access (RSMA) modulated streams for multiple-input, multiple-output (MIMO) transmission. The wireless device may perform a MIMO layer mapping and precoding on the multi-layer RSMA modulated streams prior to MIMO transmission. In some cases, the wireless device may use a combination of multi-layer RSMA transport blocks and non-multi-layer RSMA transport blocks for a MIMO transmission. The wireless device may be a user equipment (UE) or a base station. If the wireless device is a UE, the UE may receive a multi-layer RSMA configuration from a serving base station. The wireless device may adjust a rate of data transmission by adjusting parameters of the RSMA modulated streams, such as the number of layers.

To generate a multi-layer RSMA modulated stream, the wireless device may divide a data stream into multiple data sub-streams. The wireless device may map the data sub-streams to RSMA layers. The wireless device may encode, rate match, modulate, spread and scramble the RSMA layers before combining them into a combined data stream. The number of RSMA layers may be configurable. The RSMA layer mapping may provide a one-to-one mapping or a one-to-many mapping of data sub-streams to RSMA layers, among other mapping configurations. Mapping the data sub-stream to multiple RSMA layers may provide greater redundancy for the information bits of the data sub-stream.

In some examples, the wireless device may apply a pseudorandom scrambling sequence to each of the RSMA layers. Pseudorandom scrambling sequences may be layer-specific short codes. In some cases, to extend the short code, the sub-layer pseudorandom sequences may be repeated or repeated with permutation across layers. The pseudorandom scrambling sequences may be orthogonal to each other, such that the layers are orthogonal to each other after the scrambling sequences are applied. In some cases, an additional phase rotation or power scaling factor may be applied to each RSMA layer. The RSMA layers may then be synchronized and combined (e.g., added). The wireless device may apply a scrambling sequence to the combined RSMA layers.

The multi-layer RSMA modulated stream may be mapped to MIMO layers. The MIMO layer mapping may be based on various mapping configurations. In some examples, the wireless device may transmit a combination of multi-layer RSMA modulated streams and non-multi-layer RSMA modulated streams. The wireless device may precode the MIMO layers and map the precoded MIMO layers to different tones for transmission. The wireless device may apply a cyclic prefix to the MIMO layers. In some examples, the cyclic prefix may be an orthogonal frequency division multiplexing (OFDM) cyclic prefix. The wireless device may then transmit the modulated streams using MIMO antennas to another wireless device.

Aspects of the disclosure are initially described in the context of a wireless communications system. Examples of processes and signaling exchanges that support multi-layer modulated streams are then described. Aspects of the disclosure are further illustrated by and described with reference to apparatus diagrams, system diagrams, and flowcharts that relate to multi-layer modulated streams.

FIG. 1 illustrates an example of a wireless communications system 100 that supports multi-layer modulated streams in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems, a wireless device engaging in MIMO communications may map streams of data to one or more MIMO layers for transmission. However, such techniques may be limited to relatively low rates of data transmission. To increase the rate of transmission, the wireless device may change a modulation and coding scheme (MCS) or a MIMO rank. However, modifying these factors alone to increase the rate of transmission may cause other adverse effects or may be otherwise insufficient. Wireless communications system 100 may support efficient techniques for increasing data rates and improving throughput.

In particular, a wireless device, such as a UE 115 or base station 105, may split a data stream into multiple data sub-streams, map the data sub-streams to layers of a multi-layer modulated stream, and prepare the layers simultaneously. For example, the wireless device may encode, modulate, rate match, and spread the layers. In some examples, the wireless device may map the data sub-streams to the layers at various points in preparation (e.g., before or after encoding, modulating, rate matching, or spreading). The wireless device may apply a layer-specific scrambling sequence to each layer to make the layers orthogonal to each other. The wireless device may then combine the layers and apply a device-specific spreading sequence to the combined data stream. The wireless device may map a set of combined data streams to MIMO layers, precode the MIMO layers, and transmit the MIMO layers by MIMO transmission.

Figure 2:
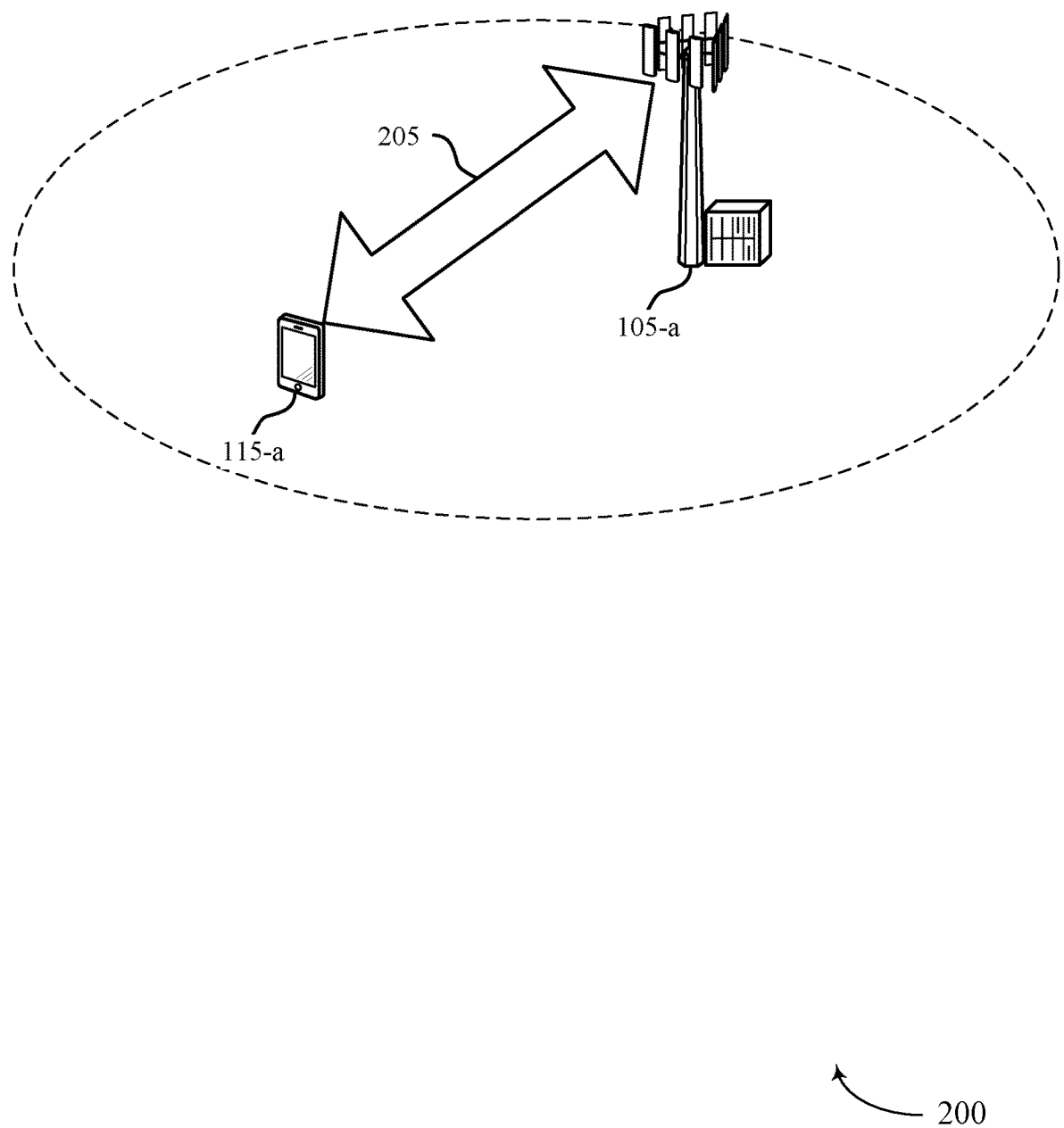

FIG. 2 illustrates an example of a wireless communications system 200 that supports multi-layer modulated streams in accordance with aspects of the present disclosure. In some examples, wireless communications system 200 may implement aspects of wireless communications system 100. Wireless communications system 200 may include UE 115-a and base station 105-a, which may be respective examples of a UE 115 and a base station 105 as described with reference to FIG. 1. UE 115-a and base station 105-a may each be capable of transmitting a MIMO transmission using one or more multi-layer RSMA modulated streams as described herein. For example, UE 115-a and base station 105-a may communicate via communication link 205. In some examples, base station 105-a may indicate a multi-layer RSMA modulated stream configuration to UE 115-a in downlink control information (DCI). In some cases, a modulated stream may be referred to as a transport block, or the modulated stream may be an example of a transport block.

UE 115-a may prepare a MIMO transmission to base station 105-a. UE 115-a may split a data stream into multiple data sub-streams and prepare each data sub-stream simultaneously or in parallel. UE 115-a may encode each data sub-stream and map the data sub-streams to RSMA layers. UE 115-a may map one data sub-stream to one RSMA layer, one data sub-stream to multiple RSMA layers, multiple data sub-streams to one RSMA layer, or any combination thereof. UE 115-a may then rate match and modulate the RSMA layers. In some instances, UE 115-a may modulate the symbols during the rate matching process. In some cases, UE 115-a may spread the RSMA layers based on a repetition spreading. UE 115-a may apply RSMA layer-specific pseudorandom scrambling sequences to each of the RSMA layers before combining the layers. In some examples, UE 115-a may apply a phase rotation or power scaling factor to each layer before combining. In some examples, UE 115-a may apply a pseudorandom scrambling sequence to the combined RSMA layers to generate an RSMA modulated stream.

The point at which the RSMA layer mapping occurs may be configurable. In some cases, UE 115-a may map the data sub-streams to RSMA layers before encoding the data sub-streams. In other cases, UE 115-a may map the data sub-streams to RSMA layers after encoding, rate matching, and modulating the data sub-streams. UE 115-a may alternatively perform the multi-layer RSMA layer mapping at other times within the data processing flows described herein.

UE 115-a may generate a number of multi-layer RSMA modulated streams. UE 115-a may map the multi-layer RSMA modulated streams to MIMO layers. In some examples, UE 115-a may map the multi-layer RSMA modulated streams to MIMO layers based on a one-to-one configuration, a one-to-many configuration, or a many-to-one configuration, or any combination thereof. In some examples, UE 115-a may map non-multi-layer RSMA modulated streams (e.g., nominal modulated streams) to MIMO layers as well. UE 115-a may then precode the MIMO layers and map the MIMO layers to tones for transmission. UE 115-a may then transmit the modulated streams in a MIMO transmission to base station 105-a.

Figure 3:
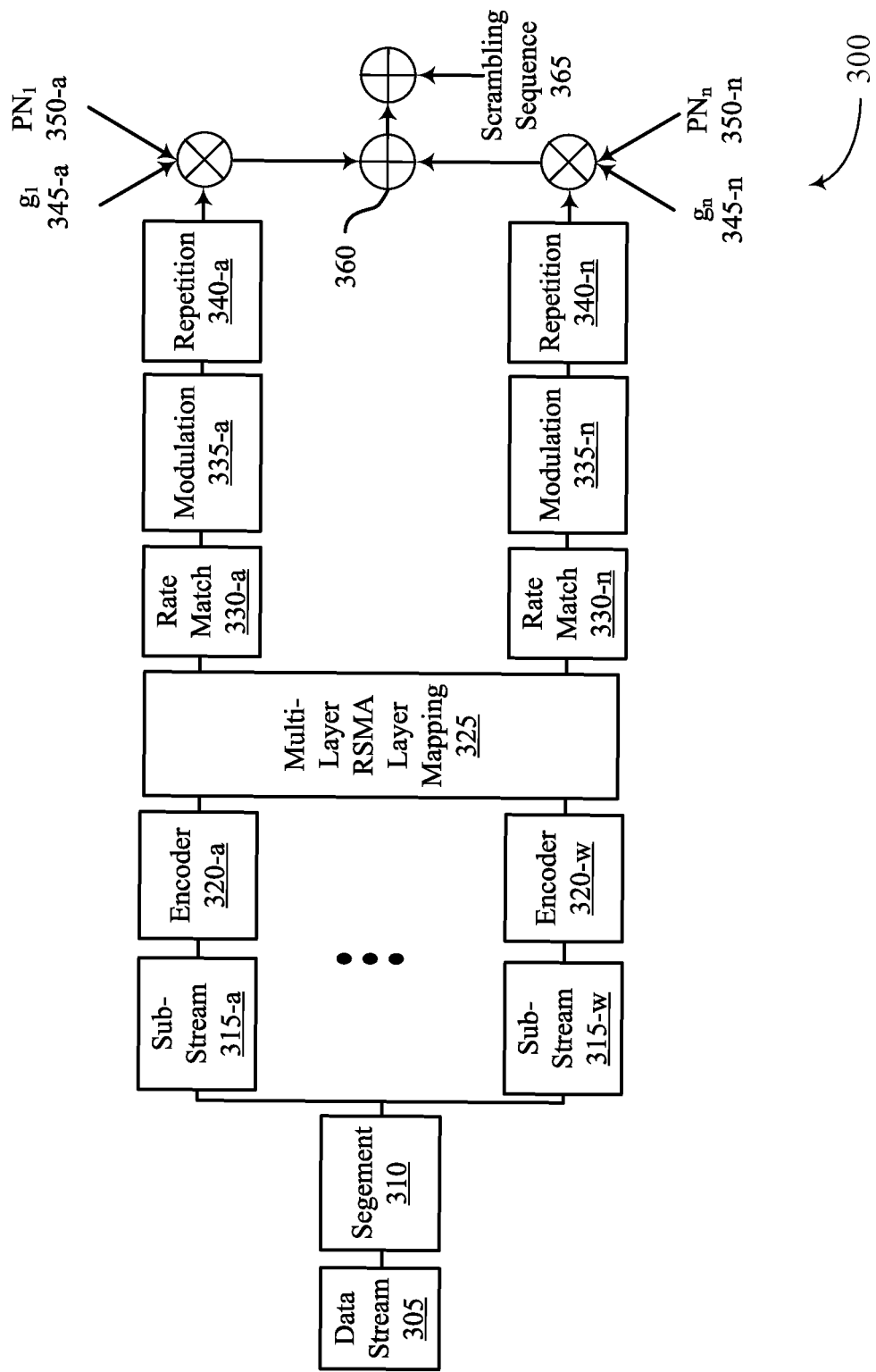
FIGS. 3 and 4 illustrate examples of multi-layer resource sharing multiple-access (RSMA) modulated stream generation procedures that supports multi-layer modulated streams in accordance with aspects of the present disclosure.

FIG. 3 illustrates an example of a multi-layer RSMA modulated stream generation procedure 300 that supports multi-layer modulated streams in accordance with aspects of the present disclosure. In some examples, multi-layer RSMA modulated stream generation procedure 300 may implement aspects of wireless communications system 100. A wireless device, such as a UE 115 or a base station 105 of FIG. 1, may prepare multi-layer RSMA modulated streams for MIMO transmission. If the wireless device is a UE 115, the UE 115 may receive a multi-layer RSMA configuration from a serving base station 105. The wireless device may perform a MIMO layer mapping then precode the multi-layer RSMA modulated streams prior to MIMO transmission. In some cases, the wireless device may use a combination of multi-layer RSMA modulated streams and non-multi-layer RSMA modulated streams for a MIMO transmission.

To generate a multi-layer RSMA modulated stream, the wireless device may divide a data stream 305 into multiple data sub-streams 315. The data stream 305 may be segmented 310 and assigned into the multiple data sub-streams 315. For example, the segmentation 310 may produce w data sub-streams 315, including data sub-stream 315-a and data sub-stream 315-w. In some examples, the data stream 305 may include at least a portion of a transport block. For example, a single transport block may be segmented into multiple data sub-streams 315 (e.g., generating w data sub-streams 315 from one transport block), or multiple transport blocks may be assigned to different data sub-streams 315 (e.g., generating w data sub-streams 315 from w transport blocks), or some combination thereof.

In some cases, the wireless device may perform a multi-layer RSMA layer mapping 325 before a channel encoding 320 the data sub-streams, or the wireless device may perform a multi-layer RSMA layer mapping 325 after performing the channel encoding 320. In some examples, the wireless device may encode the data sub-streams after mapping the multiple data sub-streams to the RSMA layers. In other examples, the wireless device may encode the data sub-streams before mapping to the RSMA layers.

The multi-layer RSMA layer mapping may provide a number of RSMA layers (e.g., n RSMA layers), which the wireless device rate matches (e.g., at rate match 330-a and rate match 330-n), modulates (e.g., at modulation 335-a and modulation 335-n), and scrambles (e.g., with layer-specific pseudorandom scrambling sequences (e.g., pseudo-noise (PN) sequences) 350-a and 350-n) before combining. In some examples, the number of data sub-streams 315 may be the same as the number of RSMA layers (e.g., w is equal to n). In other examples, the number of data sub-streams may be different from the number of RSMA layers (e.g., w is not equal to n). The number of RSMA layers may be configurable.

The multi-layer RSMA layer mapping 325 may provide a one-to-one mapping or a one-to-many mapping for the data sub-streams 315 to RSMA layers. For example, a data sub-stream 315 may be mapped to one RSMA layer, or the data sub-stream may be mapped to multiple RSMA layers. Mapping the data sub-stream 315 to multiple RSMA layers may provide greater redundancy for the information bits of the data sub-stream 315. In some examples, multiple data sub-streams 315 may be mapped to one RSMA layer. That is, the RSMA layer may include information bits from multiple different data sub-streams 315. The multi-layer RSMA layer mapping 325 may provide configurations for any one or more of the described mapping techniques, among other mapping techniques not described.

In some cases, rate adaptation for the MIMO transmission may be based on characteristics of the multi-layer RSMA modulated streams. For example, the rate adaptation may be based on a number of data sub-streams 315, a number of multi-layer RSMA layers, or both. Additionally, or alternatively, the rate adaptation may be based on configurations of the multi-layer RSMA layer mapping 325 (e.g., one-to-one mapping, one-to-many mapping, etc.), a modulation and coding scheme (MCS) for each multi-layer RSMA layer, a rate matching rule for each multi-layer RSMA layer (e.g., a repetition factor), a sub-layer pseudorandom scrambling sequence 350, a scaling factor 345, or any combination thereof. In some examples, multi-layer RSMA modulated streams may have a higher rate adaptation than single-layer RSMA modulated streams. The rate adaptation may also be based on a number of multi-layer RSMA modulated streams and a number of MIMO layers for the MIMO transmission. In some cases, the rate adaptation may be based on a mapping configuration for the MIMO layer mapping.

In some non-orthogonal multiple access (NOMA) configurations, multi-layer transmission may be feasible with at least one transmit antenna (e.g., single-layer MIMO). As an example, a MTC wireless device may use a coding rate of 1/2 with a repetition factor of 4 using single-layer RSMA for a low rate transmission, or the MTC wireless device may use a coding rate of 1/2 with a repetition of factor 4 and three RSMA layers for a higher rate of transmission.

The encoded and rate matched bits of the RSMA layers may then be modulated (e.g., at modulation 335-a for the first RSMA layer and modulation 335-n for the nth RSMA layer). In some cases, the modulated symbols of the RSMA layers may be spread by a repetition spreading, such as at repetition 340-a and repetition 340-n. In some other examples, the symbols of each RSMA layer may be modulated during the rate matching 340. When the multi-layer RSMA layer mapping is one-to-many, the number of repetitions of modulated symbols may be different across the different RSMA layers. Additionally, or alternatively, when the multi-layer RSMA layer mapping is one-to-one, the number of repetitions of modulated symbols may be the same across the different RSMA layers.

The multi-layer RSMA layer mapping 325 may occur at different points of the multi-layer RSMA modulated stream generation procedure 300. For example, the multi-layer RSMA layer mapping 325 may occur after modulation 335 and before repetition 340. In some other examples, the multi-layer RSMA layer mapping 325 may occur after rate matching 330 and before modulation 335, or after the modulated symbol repetition 340 and before applying a sub-layer pseudorandom scrambling sequence 350. Additionally, or alternatively, the multi-layer RSMA layer mapping 325 may occur at other points not shown or discussed.

In some examples, the wireless device may apply layer-specific spreading sequences 350 to each of the RSMA layers. For example, spreading sequence 350-a may be applied to the first RSMA layer, and spreading sequence 350-n may be applied to the nth RSMA layer. The spreading sequences 350 may, in some cases, be short codes. To extend the codes, the spreading sequences 350 may be repeated or repeated with permutation across the RSMA layers. The spreading sequences 350 may be orthogonal to each other or may make the RSMA layers orthogonal to each other once applied to the layers. In some examples, the spreading sequences may include a repetition of quasi-orthogonal sub-layer code, such as a welch bound achieving code. In some cases, an additional phase rotation or power scaling factor 345 may be applied to each RSMA layer (e.g., scaling factor 345-a is applied to the first layer and scaling factor 345-n is applied to the nth layer).

The RSMA layers may be synchronized and combined (e.g., added) at 360. The wireless device may apply another scrambling sequence 365 to the combined RSMA layers, generating a multi-layer RSMA modulated stream.

Figure 4:
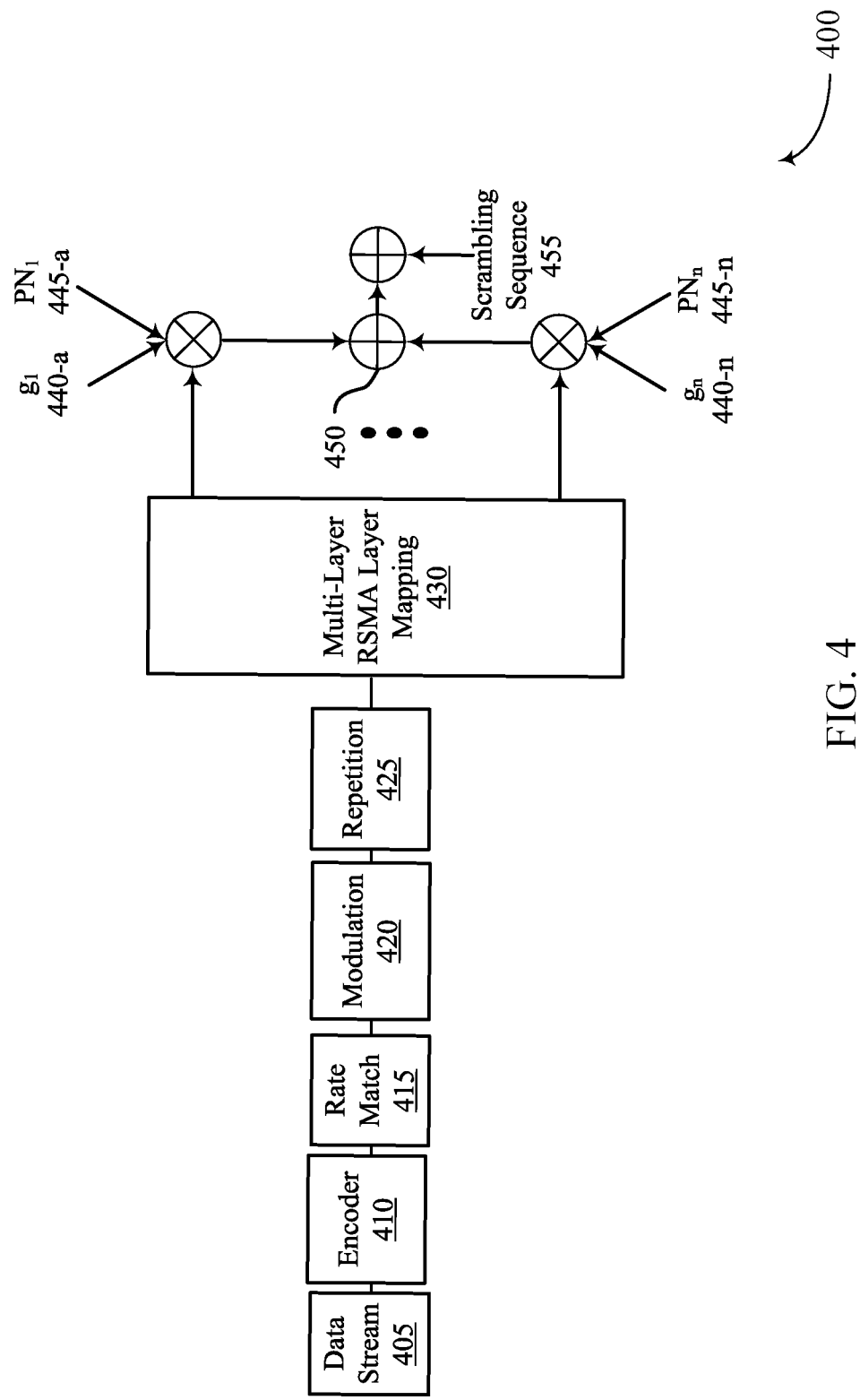

FIG. 4 illustrates an example of a multi-layer RSMA modulated stream generation procedure 400 that supports multi-layer modulated streams in accordance with aspects of the present disclosure. In some examples, multi-layer RSMA modulated stream generation procedure 400 may implement aspects of wireless communications system 100. A wireless device, such as a UE 115 or a base station 105 of FIG. 1, may prepare multi-layer RSMA modulated streams for MIMO transmission. If the wireless device is a UE 115, the UE 115 may receive a multi-layer RSMA configuration from a serving base station 105. The wireless device may perform a MIMO layer mapping then precode the multi-layer RSMA modulated streams prior to MIMO transmission. In some cases, the wireless device may use a combination of multi-layer RSMA modulated streams and non-multi-layer RSMA modulated streams for a MIMO transmission.

In some techniques used to generate a multi-layer RSMA modulated stream, the wireless device may divide a data stream 405 into multiple data sub-streams, as described above with reference to FIG. 3. In some examples, the data stream 405 may include at least a portion of a transport block. Data stream 405 may include a transport block which is not divided into multiple data sub-streams. In some other examples, the data stream 405 may be an example of a data sub-stream which was previously segmented.

The wireless device may encode the data stream 405 (e.g. by an encoder 410) as described with reference to the encoding of a data sub-stream in FIG. 3. In some cases, the wireless device may rate match 415 after encoding the data stream 405. The wireless device may then modulate the data stream at modulation 420. In some examples, the wireless device may spread the data stream by a repetition spreading 425. The wireless device may then map the data stream 405 to RSMA layers at a multi-layer RSMA layer mapping 430.

The multi-layer RSMA layer mapping 430 may provide a one-to-one mapping or a one-to-many mapping for the data stream 405 to RSMA layers. For example, the data stream 405 may be mapped to one RSMA layer, or the data stream 405 may be mapped to multiple RSMA layers. Mapping the data stream 405 to multiple RSMA layers may provide greater redundancy for the information bits of the data stream 405. The number of RSMA layers may be configurable.

The multi-layer RSMA layer mapping 430 may occur at different points of the multi-layer RSMA modulated stream generation procedure 400. For example, the multi-layer RSMA layer mapping 430 may occur after modulation 420 and before repetition 425. In some other examples, the multi-layer RSMA layer mapping 430 may occur after the encoder 410 and before rate matching 415, or after rate matching 415 and before modulation 420. Additionally, or alternatively, the multi-layer RSMA layer mapping 430 may occur at other points not shown or discussed.

In some examples, the wireless device may apply layer-specific spreading sequences 445 to each of the RSMA layers. For example, spreading sequence 445-a may be applied to the first RSMA layer, and spreading sequence 445-n may be applied to the nth RSMA layer. The spreading sequences 445 may, in some cases, be short codes. To extend the codes, the spreading sequences 445 may be repeated or repeated with permutation across the RSMA layers. The spreading sequences 445 may be orthogonal to each other or may make the RSMA layers orthogonal to each other once applied to the layers. In some examples, the spreading sequences may include a repetition of quasi-orthogonal sub-layer code, such as a welch bound achieving code. In some cases, an additional phase rotation or power scaling factor 440 may be applied to each RSMA layer (e.g., scaling factor 440-a is applied to the first layer and scaling factor 440-n is applied to the nth layer).

The RSMA layers may be synchronized and combined (e.g., added) at 450. The wireless device may apply another scrambling sequence 455 to the combined RSMA layers, generating a multi-layer RSMA modulated stream.

Figure 5:
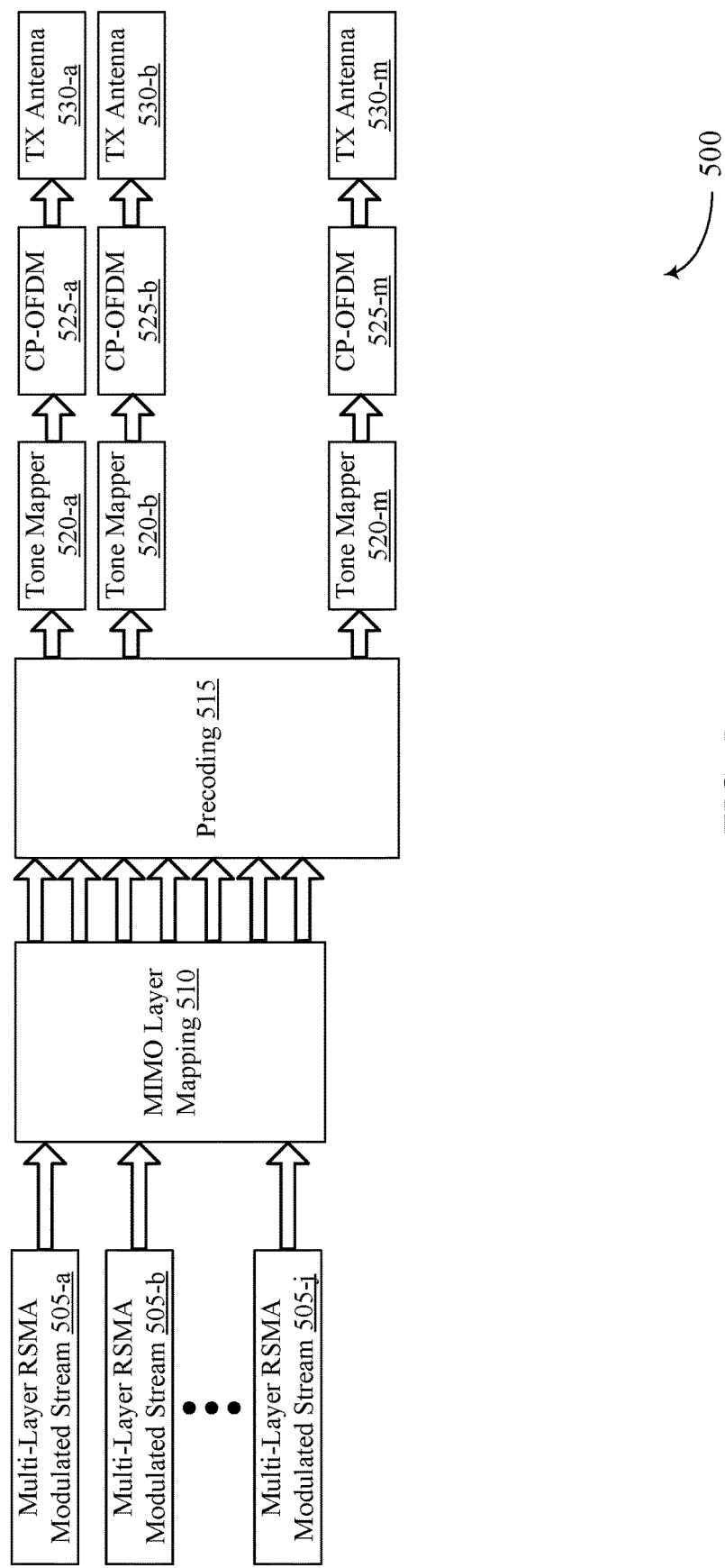
FIG. 5 illustrates an example of a multiple-input, multiple-output (MIMO) transmission preparation procedure that supports multi-layer modulated streams in accordance with aspects of the present disclosure.

FIG. 5 illustrates an example of a MIMO transmission preparation procedure 500 that supports multi-layer modulated streams in accordance with aspects of the present disclosure. In some examples, MIMO transmission preparation procedure 500 may implement aspects of wireless communications system 100. A wireless device may prepare multi-layer RSMA modulated streams 505 as described with reference to FIG. 3. MIMO transmission preparation procedure 500 illustrates processes between generating the multi-layer RSMA modulated streams 505 and a MIMO transmission. The wireless device may engage in MIMO communication using a number of transmit antennas (e.g., including antenna 530-a, 530-b, and 530-m).

The wireless device may generate j multi-layer RSMA modulated streams 505. For example, multi-layer RSMA modulated stream 505-a corresponds to a first, multi-layer RSMA modulated stream 505-b corresponds to a second, and multi-layer RSMA modulated stream 505-j corresponds to a jth multi-layer RSMA modulated stream 505.

The multi-layer RSMA modulated streams 505 may be mapped to MIMO layers by a MIMO layer mapping 510. In some examples, the MIMO layer mapping 510 may be one-to-one, where each multi-layer RSMA modulated stream 505 maps to one MIMO layer. In some other examples, a multi-layer RSMA modulated stream 505 may be mapped to multiple MIMO layers (e.g., a one-to-many mapping). Additionally, or alternatively, multiple multi-layer RSMA modulated streams 505 may be mapped to one MIMO layer. The MIMO layer mapping 510 may use a combination of any one or more of the described mappings. In some examples, the wireless device may generate a combination of multi-layer RSMA modulated streams 505 and non-multi-layer RSMA modulated streams, which may similarly be mapped to MIMO layers as described.

The wireless device may support transparent DMRS and non-transparent DMRS. For transparent DRMS, DMRS may be added after the MIMO layer mapping 510. Thus, the number of DMRS may be different than the number of multi-layer RSMA layers. For non-transparent DMRS, DMRS may be added after a precoding 515 (e.g., before the tone mappers 520). The number of DMRSs may similarly be independent from the number of multi-layer RSMA layers.

The wireless device may precode the MIMO layers at a precoding 515. The wireless device may then map the precoded MIMO layers to tones by a tone mapper 520. For example, the wireless device may map the MIMO layers using tone mapper 520-a, tone mapper 520-b and tone mapper 520-m, where m is the number of MIMO layers generated by the precoding 515. The wireless device may apply a cyclic prefix 525 to the MIMO layers. In some examples, the cyclic prefix 525 may be an OFDM cyclic prefix. In some cases, MIMO layer may have a cyclic prefix applied. Thus, cyclic prefix 525-a may be applied to the first MIMO layer, cyclic prefix 525-b may be applied to the second MIMO layer, and cyclic prefix 525-m may be applied to the mth MIMO layer. The cyclic prefix 525 may be based on a discrete Fourier transform (DFT)-spread OFDM (DFT-s-OFDM) modulation. The wireless device may then transmit the prepared bits using MIMO antennas 530 to another wireless device.

Figure 6:
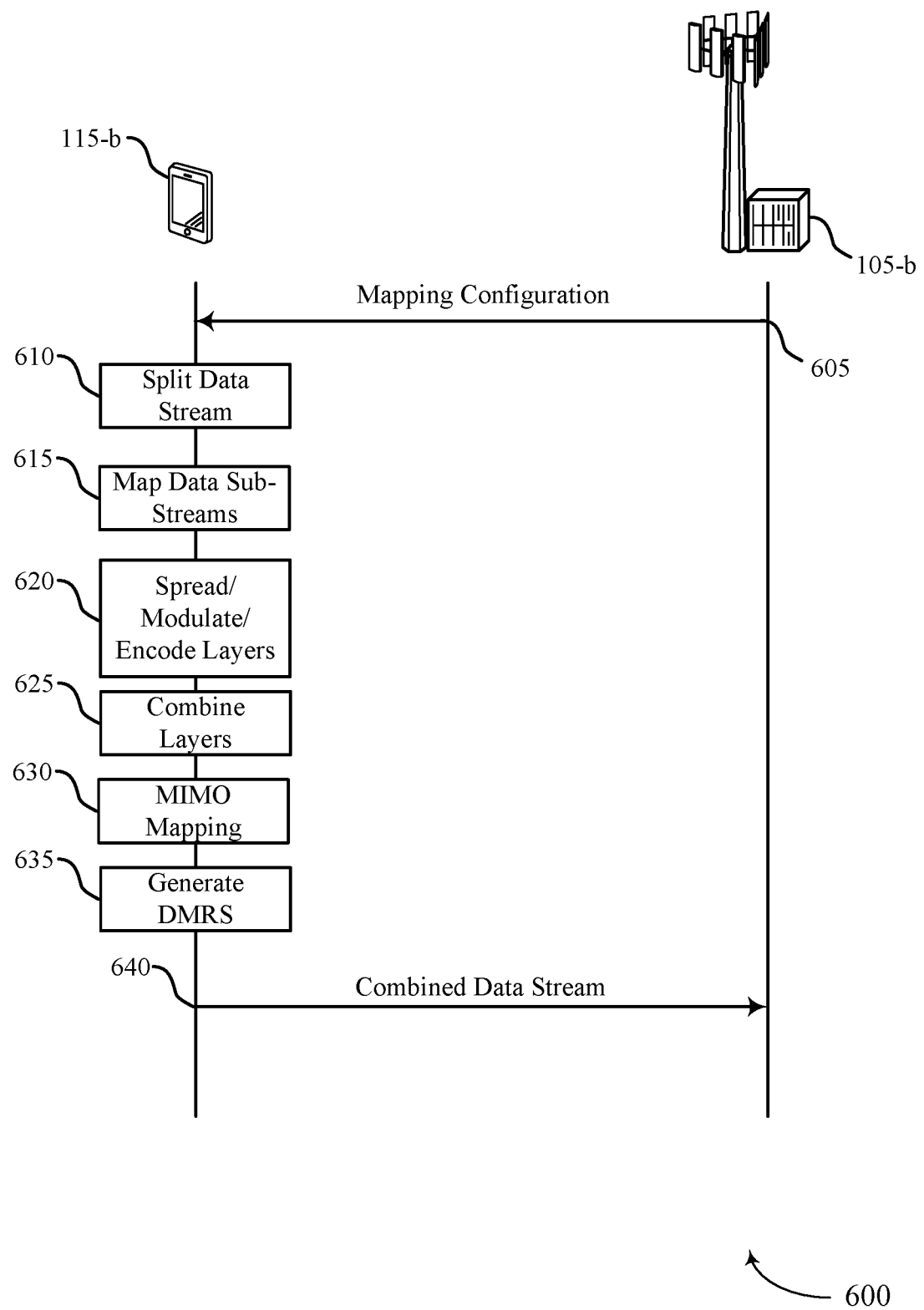
FIG. 6 illustrates an example of a process flow that supports multi-layer modulated streams in accordance with aspects of the present disclosure.

FIG. 6 illustrates an example of a process flow 600 that supports multi-layer modulated streams in accordance with aspects of the present disclosure. In some examples, process flow 600 may implement aspects of wireless communications system 100. Process flow 600 may include UE 115-b and base station 105-b, which may be respective examples of a UE 115 and a base station 105 as described herein. In the example of FIG. 6, UE 115-b may prepare and transmit the combined data stream. In other examples, base station 105-b may prepare and transmit the combined data stream as described (e.g., perform 610 through 635).

At 605, base station 105-b may transmit an indication of a mapping configuration to UE 115-b. In some examples, base station 105-b transmits DCI to signal the multi-layer modulated stream mapping configuration. In some cases, the multi-layer modulated stream mapping configuration may include a one data sub-stream to one layer mapping, a one data sub-stream to many layer mapping, a many data sub-stream to one layer mapping, or a combination thereof.

At 610, UE 115-b may split a data stream into a set of data sub-streams. In some examples, UE 115-b may segment a transport block into a set of segmented transport blocks or assign a set of transport blocks to different sub-data streams, or both. At 615, UE 115-b may map the data sub-streams to a set of layers of a multi-layer modulated stream (e.g., to RSMA layers) according to the multi-layer modulated stream mapping configuration.

At 620, UE 115-b may spread, modulate, and encode the layers. For example, UE 115-b may encode each of the set of layers after mapping the set of data sub-streams to the set of layers. In some examples, UE 115-b may modulate each of the set of encoded layers onto respective sets of symbols. In some instances, UE 115-b may spread each of the set of layers according to a repetition spreading. In some cases, each of the set of layers may be spread using a different number of repetitions. In some cases, UE 115-b may apply a phase rotation, a power scaling factor, or a combination thereof to each layer of the set of layers.

In some cases, UE 115-b may encode each of the set of data streams according to a code rate before mapping the set of data sub-streams to the set of layers. The code rate may be based on a number of data sub-streams in the set of data sub-streams.

At 625, UE 115-b may combine the layers into a combined data stream. In some cases, UE 115-b may synchronize the set of layers with respect to each other before combining the set of layers. In some examples, UE 115-b may apply a scrambling code to the combined data stream prior to transmission, where the scrambling code is specific to UE 115-b.

At 630, UE 115-b may map a set of combined data streams from a set of multi-layer modulated streams to a set of MIMO layers according to a MIMO mapping configuration. In some examples, the MIMO mapping configuration may include a one multi-layer modulated stream to one MIMO layer mapping, a one multi-layer modulated stream to many MIMO layer mapping, a many multi-layer modulated stream to one MIMO layer mapping, or a combination thereof.

At 635, UE 115-b may generate DMRS corresponding to each of the MIMO layers. In some examples, UE 115-b may precode each of the set of MIMO layers with a corresponding DMRS. At 640, UE 115-b may transmit the combined data stream to base station 105-b in the multi-layer modulated stream.

Figure 7:
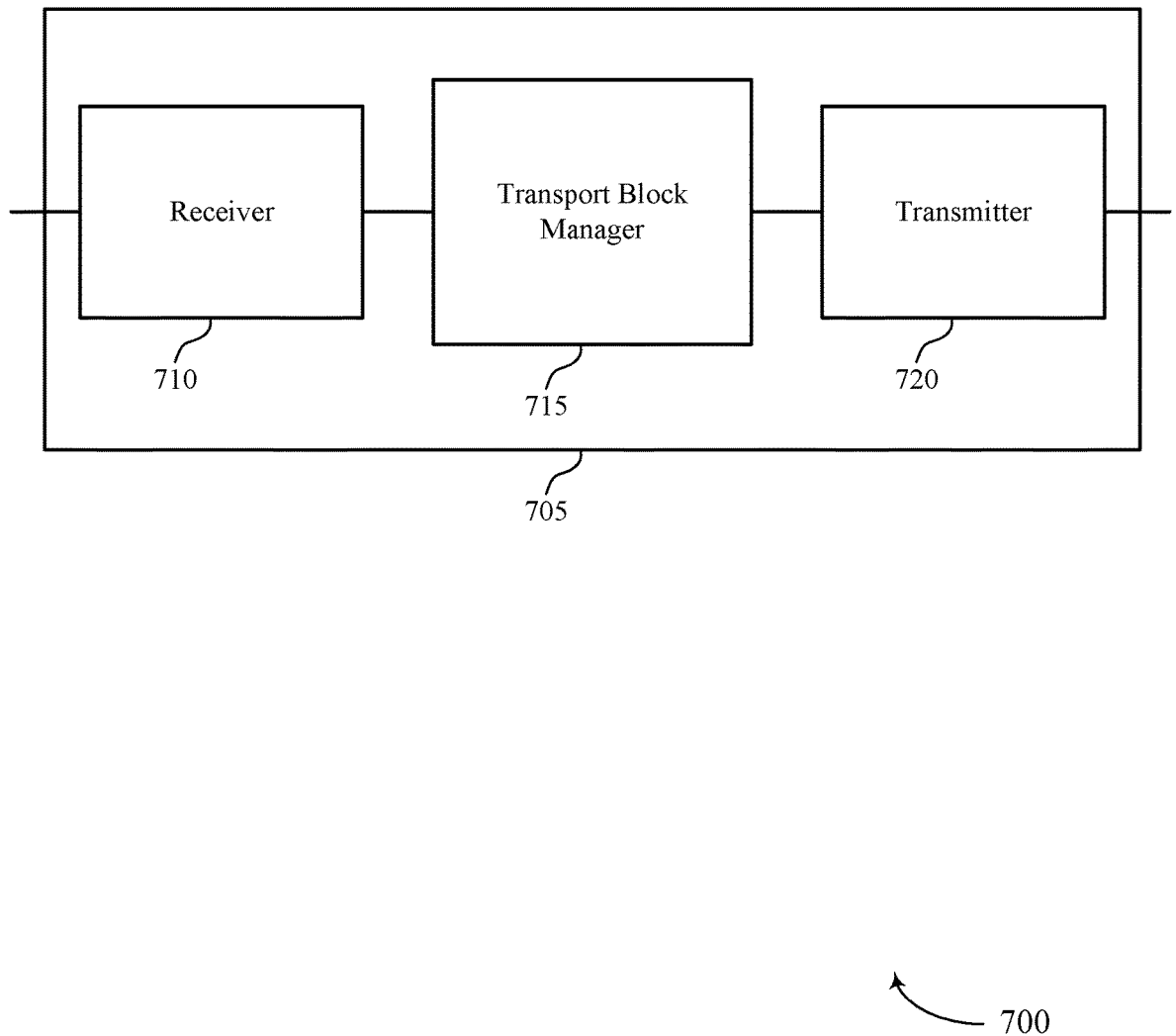
FIGS. 7-9 show block diagrams of a device that supports multi-layer modulated streams in accordance with aspects of the present disclosure.

FIG. 7 shows a block diagram 700 of a wireless device 705 that supports multi-layer modulated streams in accordance with aspects of the present disclosure. Wireless device 705 may be an example of aspects of a wireless device as described herein. Wireless device 705 may include receiver 710, transport block manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to multi-layer modulated streams, etc.). Information may be passed on to other components of the device. The receiver 710 may be an example of aspects of the transceiver 1035 described with reference to FIG. 9. The receiver 710 may utilize a single antenna or a set of antennas.

Transport block manager 715 may be an example of aspects of the transport block manager 915 described with reference to FIG. 9. Transport block manager 715 and/or at least some of its various sub-components may be implemented in hardware, software executed by a processor, firmware, or any combination thereof. If implemented in software executed by a processor, the functions of the transport block manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The transport block manager 715 and/or at least some of its various sub-components may be physically located at various positions, including being distributed such that portions of functions are implemented at different physical locations by one or more physical devices. In some examples, transport block manager 715 and/or at least some of its various sub-components may be a separate and distinct component in accordance with aspects of the present disclosure. In other examples, transport block manager 715 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

Transport block manager 715 may identify a data stream for transmission to a wireless device in a multi-layer modulated stream, split the data stream into a set of data sub-streams, map the set of data sub-streams to a set of layers of the multi-layer modulated stream according to a multi-layer modulated stream mapping configuration, combine the set of layers into a combined data stream, and transmit the combined data stream to the wireless device in the multi-layer modulated stream.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 9. The transmitter 720 may utilize a single antenna or a set of antennas.

Figure 8:
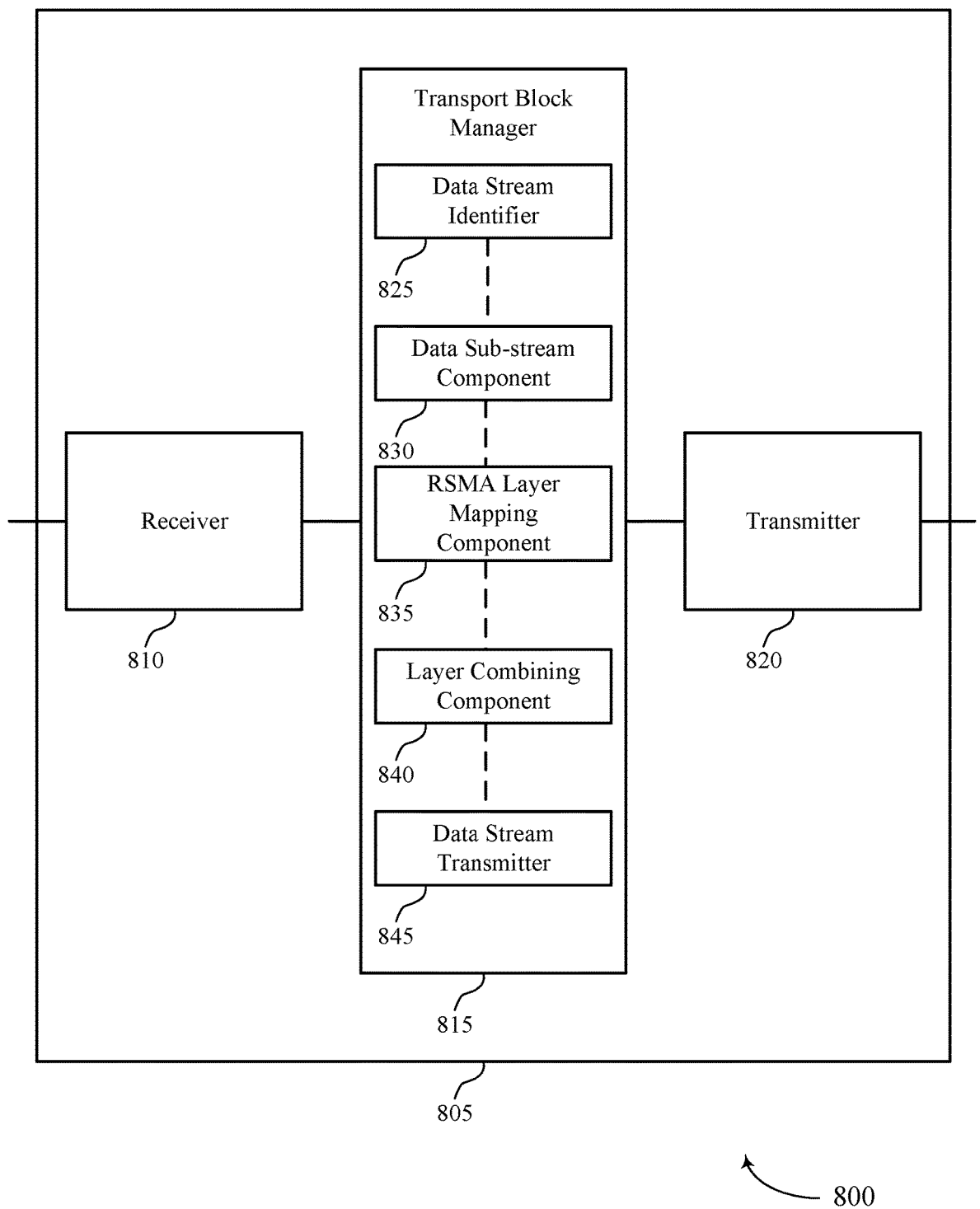

FIG. 8 shows a block diagram 800 of a wireless device 805 that supports multi-layer modulated streams in accordance with aspects of the present disclosure. Wireless device 805 may be an example of aspects of a wireless device 705 or a wireless device as described with reference to FIG. 7. Wireless device 805 may include receiver 810, transport block manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to multi-layer modulated streams, etc.). Information may be passed on to other components of the device. The receiver 810 may be an example of aspects of the transceiver 1035 described with reference to FIG. 9. The receiver 810 may utilize a single antenna or a set of antennas.

Transport block manager 815 may be an example of aspects of the transport block manager 915 described with reference to FIG. 9. Transport block manager 815 may also include data stream identifier 825, data sub-stream component 830, RSMA layer mapping component 835, layer combining component 840, and data stream transmitter 845.

Data stream identifier 825 may identify a data stream for transmission to a wireless device in a multi-layer modulated stream.

Data sub-stream component 830 may split the data stream into a set of data sub-streams. In some cases, data sub-stream component 830 may encode each of the set of data sub-streams according to a code rate before mapping the set of data sub-streams to the set of layers. In some cases, data sub-stream component 830 may adjust a rate of transmission associated with the multi-layer modulated stream by adjusting a number of the set of data sub-streams, adjusting a number of the set of layers, adjusting the multi-layer modulated stream mapping configuration, adjusting a repetition factor for the set of layers, adjusting a pseudo random sequence for the set of layers, adjusting power or phase shift factor for the set of layers, or adjusting a combination thereof. In some cases, splitting the data stream into the set of data sub-streams includes segmenting a transport block into a set of segmented transport blocks or assigning a set of transport blocks to different sub-data streams, or both. In some cases, the code rate is based on a number of the multiple data sub-streams.

RSMA layer mapping component 835 may map the set of data sub-streams to a set of layers of the multi-layer modulated stream according to a multi-layer modulated stream mapping configuration. In some cases, RSMA layer mapping component 835 may apply a scrambling code to the combined data stream prior to transmission, where the scrambling code is specific to the wireless device. In some cases, RSMA layer mapping component 835 may encode each of the set of layers after mapping the set of data sub-streams to the set of layers. In some cases, RSMA layer mapping component 835 may modulate each of the set of encoded layers onto respective sets of symbols. In some cases, RSMA layer mapping component 835 may spread each of the set of layers according to repetition spreading. In some cases, RSMA layer mapping component 835 may receive downlink control signaling indicating the multi-layer modulated stream mapping configuration.

In some cases, RSMA layer mapping component 835 may apply a pseudo-random scrambling sequence to each of the set of layers. In some cases, RSMA layer mapping component 835 may apply a phase rotation, a power scaling factor, or a combination thereof, to each of the set of layers, and synchronize the set of layers with respect to each other before combining the set of layers. In some cases, the multi-layer modulated stream mapping configuration includes a one data sub-stream to one layer mapping, a one data sub-stream to many layer mapping, a many data sub-stream to one layer mapping, or a combination thereof. In some cases, the set of layers are each spread using a different number of repetitions. In some cases, the set of layers are each spread using a same number of repetitions.

Layer combining component 840 may combine the set of layers into a combined data stream. Data stream transmitter 845 may transmit the combined data stream to the wireless device in the multi-layer modulated stream.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 9. The transmitter 820 may utilize a single antenna or a set of antennas.

Figure 9:
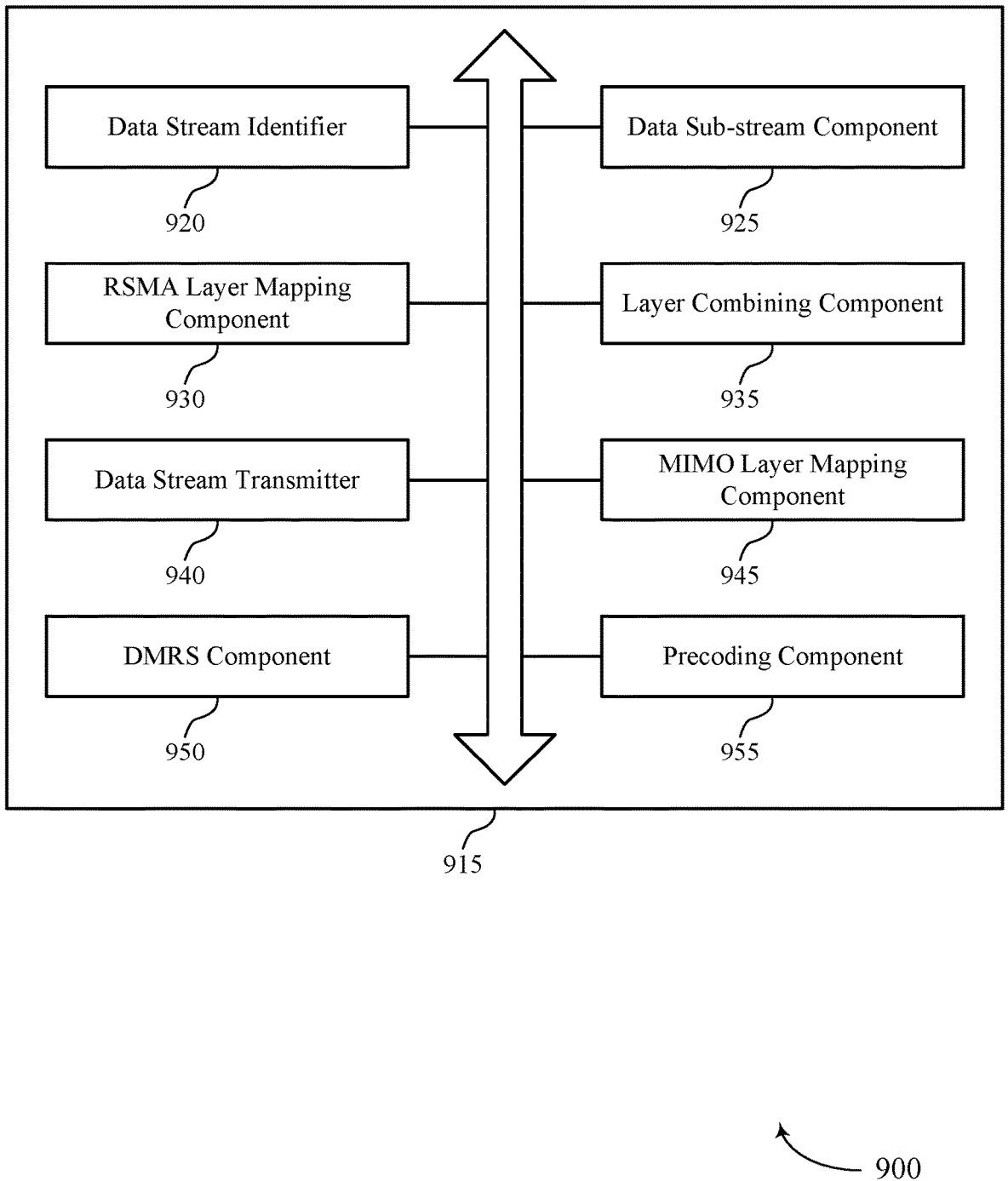

FIG. 9 shows a block diagram 900 of a transport block manager 915 that supports multi-layer modulated streams in accordance with aspects of the present disclosure. The transport block manager 915 may be an example of aspects of a transport block manager 715, a transport block manager 815, or a transport block manager 915 described with reference to FIGS. 7, 8, and 9. The transport block manager 915 may include data stream identifier 920, data sub-stream component 925, RSMA layer mapping component 930, layer combining component 935, data stream transmitter 940, MIMO layer mapping component 945, DMRS component 950, and precoding component 955. Each of these modules may communicate, directly or indirectly, with one another (e.g., via one or more buses).

Data stream identifier 920 may identify a data stream for transmission to a wireless device in a multi-layer modulated stream. Data sub-stream component 925 may split the data stream into a set of data sub-streams. In some cases, data sub-stream component 925 may encode each of the set of data sub-streams according to a code rate before mapping the set of data sub-streams to the set of layers. In some cases, data sub-stream component 925 may adjust a rate of transmission associated with the multi-layer modulated stream by adjusting a number of the set of data sub-streams, adjusting a number of the set of layers, adjusting the multi-layer modulated stream mapping configuration, adjusting a repetition factor for the set of layers, adjusting a pseudo random sequence for the set of layers, adjusting power or phase shift factor for the set of layers, or adjusting a combination thereof. In some cases, splitting the data stream into the set of data sub-stream includes segmenting a transport block into a set of segmented transport blocks or assigning a set of transport blocks to different sub-data streams, or both. In some cases, the code rate is based on a number of the multiple data sub-streams.

RSMA layer mapping component 930 may map the set of data sub-streams to a set of layers of the multi-layer modulated stream according to a multi-layer modulated stream mapping configuration. In some cases, RSMA layer mapping component 930 may apply a scrambling code to the combined data stream prior to transmission, where the scrambling code is specific to the wireless device. In some cases, RSMA layer mapping component 930 may encode each of the set of layers after mapping the set of data sub-streams to the set of layers. In some cases, RSMA layer mapping component 930 may modulate each of the set of encoded layers onto respective sets of symbols. In some cases, RSMA layer mapping component 930 may spread each of the set of layers according to repetition spreading. In some cases, RSMA layer mapping component 930 may receive downlink control signaling indicating the multi-layer modulated stream mapping configuration.

In some cases, RSMA layer mapping component 930 may apply a pseudo-random scrambling sequence to each of the set of layers. In some cases, RSMA layer mapping component 930 may apply a phase rotation, a power scaling factor, or a combination thereof, to each of the set of layers, and synchronize the set of layers with respect to each other before combining the set of layers. In some cases, the multi-layer modulated stream mapping configuration includes a one data sub-stream to one layer mapping, a one data sub-stream to many layer mapping, a many data sub-stream to one layer mapping, or a combination thereof. In some cases, the set of layers are each spread using a different number of repetitions. In some cases, the set of layers are each spread using a same number of repetitions.

Layer combining component 935 may combine the set of layers into a combined data stream. Data stream transmitter 940 may transmit the combined data stream to the wireless device in the multi-layer modulated stream. MIMO layer mapping component 945 may map a set of combined data streams from a set of multi-layer modulated streams to a set of MIMO layers according to a MIMO mapping configuration and map a set of data streams from a set of single-layer modulated streams to the set of MIMO layers. In some cases, the MIMO mapping configuration includes a one multi-layer modulated stream to one MIMO layer mapping, a one multi-layer modulated stream to many MIMO layer mapping, a many multi-layer modulated stream to one MIMO layer mapping, or a combination thereof. DMRS component 950 may generate a DMRS corresponding to each of the MIMO layers and precode each of the set of MIMO layers with a corresponding DMRS. Precoding component 955 may precode each of the set of MIMO layers and generate a DMRS corresponding to each of the precoded MIMO layers.

Figure 10:
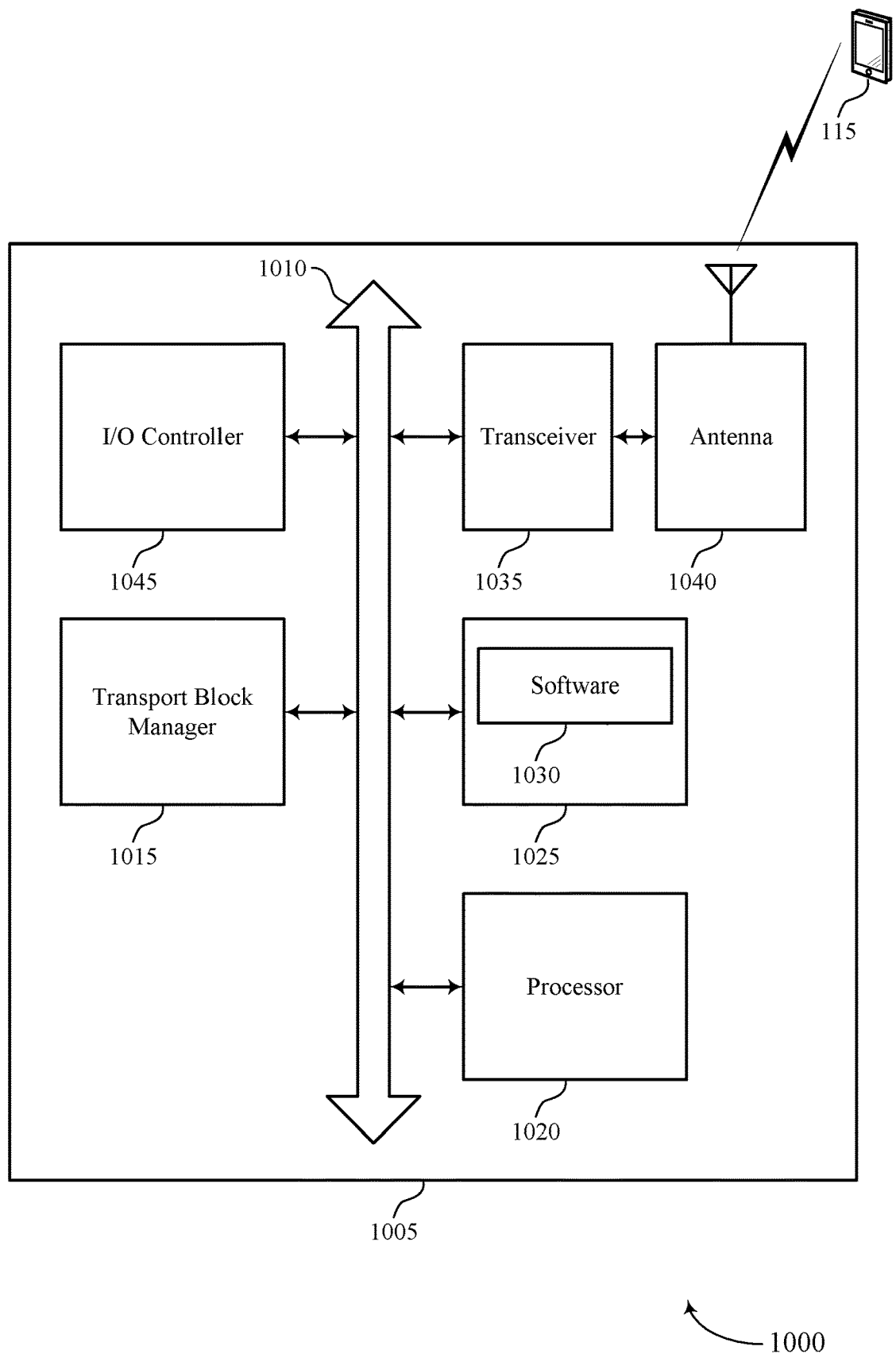
FIG. 10 illustrates a block diagram of a system including a wireless device that supports multi-layer modulated streams in accordance with aspects of the present disclosure.

FIG. 10 shows a diagram of a system 1000 including a device 1005 that supports multi-layer modulated streams in accordance with aspects of the present disclosure. Device 1005 may be an example of or include the components of wireless device 705, wireless device 805, or a wireless device as described above, e.g., with reference to FIGS. 7 and 8. Device 1005 may include components for bi-directional voice and data communications including components for transmitting and receiving communications, including transport block manager 1015, processor 1020, memory 1025, software 1030, transceiver 1035, antenna 1040, and I/O controller 1045. These components may be in electronic communication via one or more buses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting multi-layer modulated streams).

Memory 1025 may include random-access memory (RAM) and read-only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support multi-layer modulated streams. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
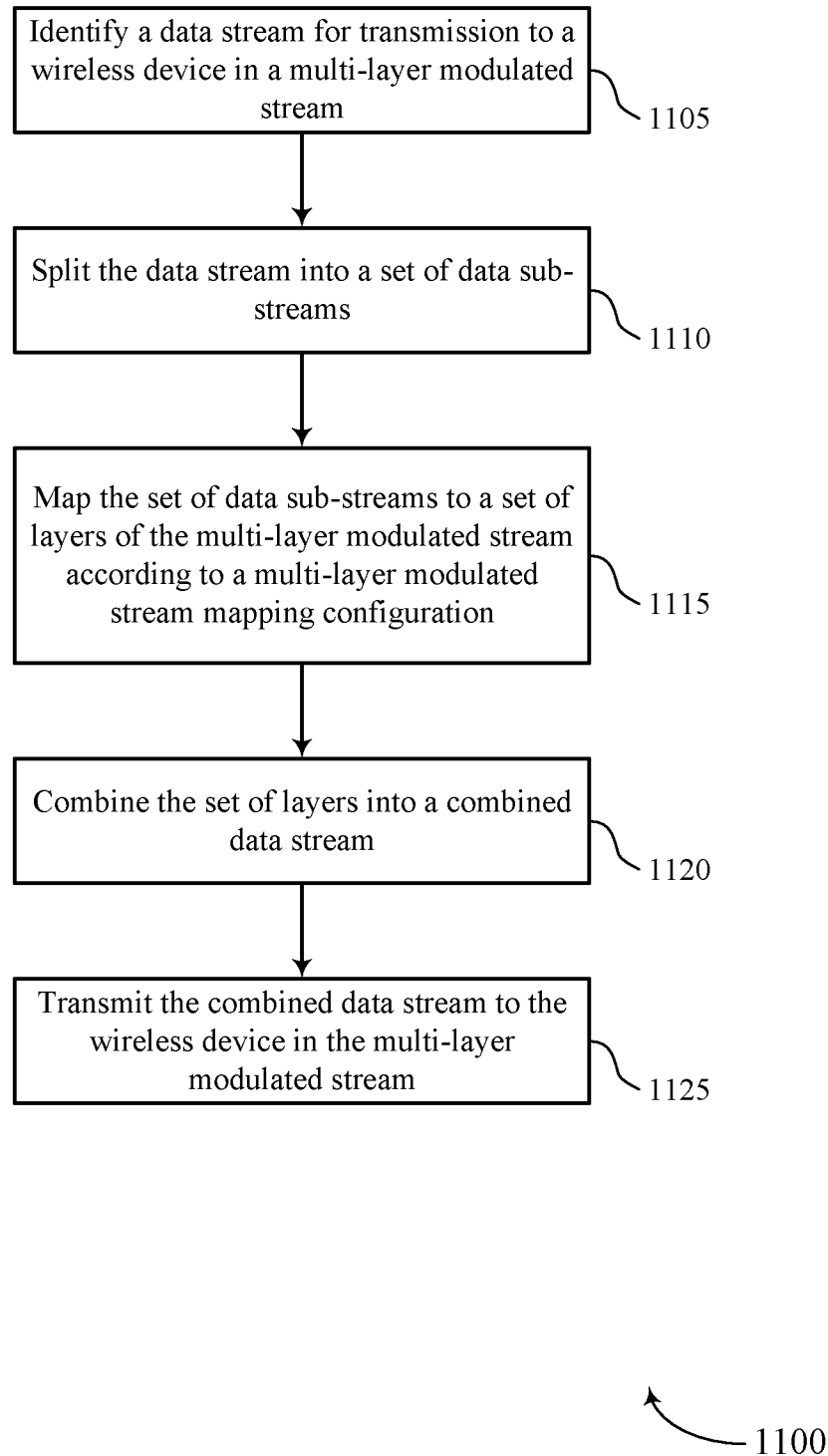
FIGS. 11 and 12 illustrate methods for multi-layer modulated streams in accordance with aspects of the present disclosure.

FIG. 11 shows a flowchart illustrating a method 1100 for multi-layer modulated streams in accordance with aspects of the present disclosure. The operations of method 1100 may be implemented by a wireless device or its components as described herein. For example, the operations of method 1100 may be performed by a transport block manager as described with reference to FIGS. 7 through 10. In some examples, a wireless device may execute a set of codes to control the functional elements of the device to perform the functions described below. Additionally, or alternatively, the wireless device may perform aspects of the functions described below using special-purpose hardware.

At 1105, the wireless device may identify a data stream for transmission to a wireless device in a multi-layer modulated stream. The operations of 1105 may be performed according to the methods described herein. In certain examples, aspects of the operations of 1105 may be performed by a data stream identifier as described with reference to FIGS. 7 through 10.

At 1110, the wireless device may split the data stream into a plurality of data sub-streams. The operations of 1110 may be performed according to the methods described herein. In certain examples, aspects of the operations of 1110 may be performed by a data sub-stream component as described with reference to FIGS. 7 through 10.

At 1115, the wireless device may map the plurality of data sub-streams to a plurality of layers of the multi-layer modulated stream according to a multi-layer modulated stream mapping configuration. The operations of 1115 may be performed according to the methods described herein. In certain examples, aspects of the operations of 1115 may be performed by a RSMA layer mapping component as described with reference to FIGS. 7 through 10.

At 1120, the wireless device may combine the plurality of layers into a combined data stream. The operations of 1120 may be performed according to the methods described herein. In certain examples, aspects of the operations of 1120 may be performed by a layer combining component as described with reference to FIGS. 7 through 10.

At 1125, the wireless device may transmit the combined data stream to the wireless device in the multi-layer modulated stream. The operations of 1125 may be performed according to the methods described herein. In certain examples, aspects of the operations of 1125 may be performed by a data stream transmitter as described with reference to FIGS. 7 through 10.

Figure 12:
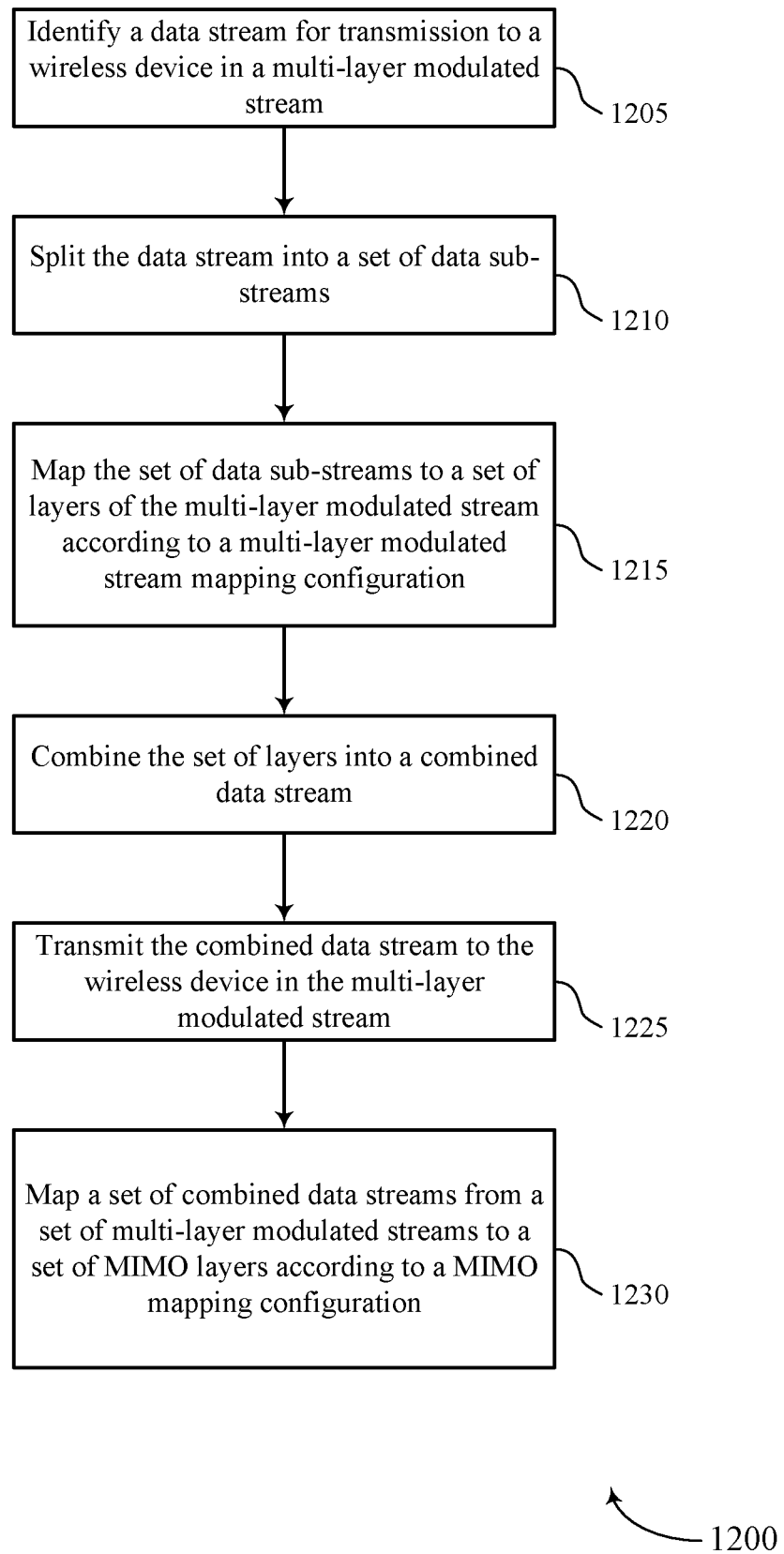

FIG. 12 shows a flowchart illustrating a method 1200 for multi-layer modulated streams in accordance with aspects of the present disclosure. The operations of method 1200 may be implemented by a wireless device or its components as described herein. For example, the operations of method 1200 may be performed by a transport block manager as described with reference to FIGS. 7 through 10. In some examples, a wireless device may execute a set of codes to control the functional elements of the device to perform the functions described below. Additionally, or alternatively, the wireless device may perform aspects of the functions described below using special-purpose hardware.

At 1205, the wireless device may identify a data stream for transmission to a wireless device in a multi-layer modulated stream. The operations of 1205 may be performed according to the methods described herein. In certain examples, aspects of the operations of 1205 may be performed by a data stream identifier as described with reference to FIGS. 7 through 10.

At 1210, the wireless device may split the data stream into a plurality of data sub-streams. The operations of 1210 may be performed according to the methods described herein. In certain examples, aspects of the operations of 1210 may be performed by a data sub-stream component as described with reference to FIGS. 7 through 10.

At 1215, the wireless device may map the plurality of data sub-streams to a plurality of layers of the multi-layer modulated stream according to a multi-layer modulated stream mapping configuration. The operations of 1215 may be performed according to the methods described herein. In certain examples, aspects of the operations of 1215 may be performed by a RSMA layer mapping component as described with reference to FIGS. 7 through 10.

At 1220, the wireless device may combine the plurality of layers into a combined data stream. The operations of 1220 may be performed according to the methods described herein. In certain examples, aspects of the operations of 1220 may be performed by a layer combining component as described with reference to FIGS. 7 through 10.

At 1225, the wireless device may transmit the combined data stream to the wireless device in the multi-layer modulated stream. The operations of 1225 may be performed according to the methods described herein. In certain examples, aspects of the operations of 1225 may be performed by a data stream transmitter as described with reference to FIGS. 7 through 10.

At 1230, the wireless device may map a plurality of combined data streams from a plurality of multi-layer modulated streams to a plurality of MIMO layers according to a MIMO mapping configuration. The operations of 1230 may be performed according to the methods described herein. In certain examples, aspects of the operations of 1230 may be performed by a MIMO layer mapping component as described with reference to FIGS. 7 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a data stream for transmission to a wireless device in a multi-layer modulated stream;
splitting the data stream into a plurality of data sub-streams;
mapping the plurality of data sub-streams to a plurality of layers of the multi-layer modulated stream according to a multi-layer modulated stream mapping configuration, the multi-layer modulated stream mapping configuration a one data sub-stream to many layer mapping or a many data sub-stream to one layer mapping;
combining the plurality of layers into a combined data stream; and
transmitting the combined data stream to the wireless device in the multi-layer modulated stream.

2. The method of claim 1, further comprising:
receiving downlink control signaling indicating the multi-layer modulated stream mapping configuration.

3. The method of claim 1, further comprising:
mapping a plurality of combined data streams from a plurality of multi-layer modulated streams to a plurality of multiple input multiple output (MIMO) layers according to a MIMO mapping configuration.

4. The method of claim 3, wherein the MIMO mapping configuration comprises a one multi-layer modulated stream to one MIMO layer mapping, a one multi-layer modulated stream to many MIMO layer mapping, a many multi-layer modulated stream to one MIMO layer mapping, or a combination thereof.

5. The method of claim 3, further comprising:
mapping a plurality of data streams from a plurality of single-layer modulated streams to the plurality of MIMO layers.

6. The method of claim 3, further comprising:
generating a demodulation reference signal (DMRS) corresponding to each of the MIMO layers; and
precoding each of the plurality of MIMO layers with a corresponding DMRS.

7. The method of claim 3, further comprising:
precoding each of the plurality of MIMO layers; and
generating a demodulation reference signal (DMRS) corresponding to each of the precoded MIMO layers.

8. The method of claim 1, wherein splitting the data stream into the plurality of data sub-streams comprises:
segmenting a transport block into a plurality of segmented transport blocks or assigning a plurality of transport blocks to different sub-data streams, or both.

9. The method of claim 1, further comprising:
encoding each of the plurality of layers after mapping the plurality of data sub-streams to the plurality of layers.

10. The method of claim 9, further comprising:
modulating each of the plurality of encoded layers onto respective sets of symbols.

11. The method of claim 10, further comprising:
spreading each of the plurality of layers according to repetition spreading.

12. The method of claim 11, wherein the plurality of layers are each spread using a same number of repetitions.

13. The method of claim 11, wherein the plurality of layers are each spread using a different number of repetitions.

14. The method of claim 10, further comprising:
applying a pseudo-random scrambling sequence to each of the plurality of layers.

15. The method of claim 14, further comprising:
applying a phase rotation, a power scaling factor, or a combination thereof, to each of the plurality of layers.

16. The method of claim 15, further comprising:
synchronizing the plurality of layers with respect to each other before combining the plurality of layers.

17. The method of claim 16, further comprising:
applying a scrambling code to the combined data stream prior to transmission, wherein the scrambling code is specific to the wireless device.

18. The method of claim 1, further comprising:
encoding each of the plurality of data sub-streams according to a code rate before mapping the plurality of data sub-streams to the plurality of layers.

19. The method of claim 18, wherein the code rate is based at least in part on a number of the plurality of data sub-streams.

20. The method of claim 1, further comprising:
adjusting a rate of transmission associated with the multi-layer modulated stream by adjusting a number of the plurality of data sub-streams, adjusting a number of the plurality of layers, adjusting the multi-layer modulated stream mapping configuration, adjusting a repetition factor for the plurality of layers, adjusting a pseudo random sequence for the plurality of layers, adjusting power or phase shift factor for the plurality of layers, or adjusting a combination thereof.

21. An apparatus for wireless communication, comprising:
means for identifying a data stream for transmission to a wireless device in a multi-layer modulated stream;
means for splitting the data stream into a plurality of data sub-streams;
means for mapping the plurality of data sub-streams to a plurality of layers of the multi-layer modulated stream according to a multi-layer modulated stream mapping configuration, the multi-layer modulated stream mapping configuration comprising a one data sub-stream to many layer mapping or a many data sub-stream to one layer mapping;
means for combining the plurality of layers into a combined data stream; and
means for transmitting the combined data stream to the wireless device in the multi-layer modulated stream.

22. An apparatus for wireless communication, comprising:
a processor;

memory in electronic communication with the processor; and instructions stored in the memory and executable by the processor to cause the apparatus to:
- identify a data stream for transmission to a wireless device in a multi-layer modulated stream;
- split the data stream into a plurality of data sub-streams;
- map the plurality of data sub-streams to a plurality of layers of the multi-layer modulated stream according to a multi-layer modulated stream mapping configuration, the multi-layer modulated stream mapping configuration comprising a one data sub-stream to many layer mapping or a many data sub-stream to one layer mapping;
- combine the plurality of layers into a combined data stream; and
- transmit the combined data stream to the wireless device in the multi-layer modulated stream.

23. The apparatus of claim 22, wherein the instructions are further executable by the processor to cause the apparatus to:
- receive downlink control signaling indicating the multi-layer modulated stream mapping configuration.

24. The apparatus of claim 22, wherein the instructions are further executable by the processor to cause the apparatus to:
- map a plurality of combined data streams from a plurality of multi-layer modulated streams to a plurality of multiple input multiple output (MIMO) layers according to a MIMO mapping configuration.

25. The apparatus of claim 24, wherein the MIMO mapping configuration comprises a one multi-layer modulated stream to one MIMO layer mapping, a one multi-layer modulated stream to many MIMO layer mapping, a many multi-layer modulated stream to one MIMO layer mapping, or a combination thereof.

26. The apparatus of claim 24, wherein the instructions are further executable by the processor to cause the apparatus to:
- map a plurality of data streams from a plurality of single-layer modulated streams to the plurality of MIMO layers.

27. The apparatus of claim 24, wherein the instructions are further executable by the processor to cause the apparatus to:
- generate a demodulation reference signal (DMRS) corresponding to each of the MIMO layers; and
- precode each of the plurality of MIMO layers with a corresponding DMRS.

28. A non-transitory computer-readable medium storing code for wireless communication, the code comprising instructions executable by a processor to:
- identify a data stream for transmission to a wireless device in a multi-layer modulated stream;
- split the data stream into a plurality of data sub-streams;
- map the plurality of data sub-streams to a plurality of layers of the multi-layer modulated stream according to a multi-layer modulated stream mapping configuration, the multi-layer modulated stream mapping configuration comprising a one data sub-stream to many layer mapping or a many data sub-stream to one layer mapping;
- combine the plurality of layers into a combined data stream; and
- transmit the combined data stream to the wireless device in the multi-layer modulated stream.

* * * * *